United States Patent
Motohashi

(10) Patent No.: US 6,263,449 B1
(45) Date of Patent: Jul. 17, 2001

(54) DATA PROCESSOR HAVING RADIO COMMUNICATION FUNCTION AND METHOD OF CONTROLLING FREQUENCY OF CLOCK SIGNALS IN DATA PROCESSOR

(75) Inventor: Teruyuki Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/226,300

(22) Filed: Jan. 7, 1999

(30) Foreign Application Priority Data

Jan. 7, 1998 (JP) .................................................. 10/013360

(51) Int. Cl.$^7$ ........................................................ G06F 1/08
(52) U.S. Cl. ............................................ 713/501; 713/600
(58) Field of Search ................................. 713/500, 501, 713/600, 601, 322

(56) References Cited

U.S. PATENT DOCUMENTS

| | | | |
|---|---|---|---|
| 4,275,457 | * 6/1981 | Leighou et al. ...................... | 364/900 |
| 5,577,026 | * 11/1996 | Gordon et al. ....................... | 370/278 |
| 6,064,890 | * 5/2000 | Hirose et al. ........................ | 455/513 |
| 6,167,281 | * 12/2000 | Sugi ..................................... | 455/502 |

FOREIGN PATENT DOCUMENTS

| | | |
|---|---|---|
| 2292867A | 3/1996 | (GB) . |
| 2304259A | 3/1997 | (GB) . |
| 2311192A | 9/1997 | (GB) . |
| 55-171143 | 12/1980 | (JP) . |
| 60-32833 | 3/1985 | (JP) . |
| 4-122130 | 4/1992 | (JP) . |
| 4-86337 | 7/1992 | (JP) . |
| 4-278728 | 10/1992 | (JP) . |
| 6-83501 | 3/1994 | (JP) . |
| 6-132837 | 5/1994 | (JP) . |
| 7-99680 | 4/1995 | (JP) . |
| 7-245577 | 9/1995 | (JP) . |
| 9-50414 | 2/1997 | (JP) . |

* cited by examiner

Primary Examiner—Dennis M. Butler
(74) Attorney, Agent, or Firm—Scully, Scott, Murphy & Presser

(57) ABSTRACT

There is provided a data processor having radio communication function, including (a) a clock generator for selectively generating clock signals having different frequencies, (b) a signal quality analyzer for analyzing quality of a received signal by comparing quality of a received signal to a predetermined threshold level, and (c) a frequency controller for causing the clock signals to have an ordinary frequency when the quality of a received signal is judged not to degrade, and causing the clock signals to have a second frequency smaller than the ordinary frequency, when the quality of a received signal is judged to degrade. In accordance with the data processor, when quality of a received signal is judged to degrade, based on an intensity of an electric field, a frequency of clock signals is caused to decrease. Hence, it is possible to reduce noises caused by clock signals, enhancing reliability in radio communication. When quality of a received signal is judged not to degrade, a clock signal is caused to have an ordinary frequency, ensuring high rate operation of the data processor.

33 Claims, 3 Drawing Sheets

DATA PROCESSOR HAVING RADIO COMMUNICATION FUNCTION AND METHOD OF CONTROLLING FREQUENCY OF CLOCK SIGNALS IN DATA PROCESSOR

BACKGROUND OF THE INVENTION

1. Field of the Invention

The invention relates to a data processor having a function of performing radio communication, and more particularly to a data processor 10 including a signal processor such as a microprocessor, which operates in accordance with clock signals. The invention also relates to a method of controlling a frequency of clock signals in accordance with which a microprocessor operates. The invention further relates to a recording medium readable by a computer, storing a program therein for causing a computer to act as a data processor or carry out a method of controlling a frequency of clock signals in accordance with which a microprocessor operates.

2. Description of the Related Art

A data processor having a function of performing radio communication generally includes a microprocessor for data processing. However, such a data processor is accompanied with a problem that operation clocks in accordance with which a microprocessor operates act as noises to thereby degrade quality of received radio signals. In order to overcome such a problem, Japanese Unexamined Patent Publication No. 7-99680 has suggested a method of decreasing a frequency of operation clocks while a radio signal is being received.

Reduction in a frequency of operation clocks is effective for noise reduction as follows. In general, operation clocks in a microprocessor is in proportion to current consumption. Accordingly, it would be possible to reduce electric power of noises by reducing a frequency of operation clocks to thereby reduce electric power consumption. In addition, reduction in a frequency of operation clocks is further accompanied with reduction in electric power of higher-order harmonics produced by operation clocks. Since the above-mentioned method of switching a frequency of operation clocks is effective for reducing current consumption of a device, the method has been adopted in many mobile communication devices.

However, in the above-mentioned method, a frequency of operation clocks in a microprocessor is always caused to reduce, while a radio signal is being received, regardless of whether quality of a received radio signal is acceptable or not. As a result, even if quality of a received signal is acceptable and noises are sufficiently small, a frequency of operation clocks is reduced, which means that a micropro-cessor operate at a lower speed.

In addition, if a frequency of operation clocks is reduced, a response speed in response to a user's operation is also reduced. In accordance with the above-mentioned method, reliability in radio communication takes precedence over high-speed operation of a microprocessor while a radio signal is being received, and thus, a user is not allowed to select high-speed operation over reliability in radio communication.

Furthermore, a user cannot notice reduction in a frequency of operation clocks until he or she knows an actual response speed of a microprocessor.

Japanese Unexamined Patent Publication No. 4-122130 has suggested a mobile radio communication device including a controller, a radio transmitting and receiving section, a rechargeable internal power source to be charged through an external power source, and a switch for turning on or off an electrical path between the external power source and the internal power source. The controller closes the switch to thereby cause the external power source to charge the internal power source while the radio transmitting and receiving section is ceased to operate, and opens the switch to thereby separate the external power source from the radio transmitting and receiving section and cause the internal power source to charge the radio transmitting and receiving section while the radio transmitting and receiving section is operating.

In accordance with the above-mentioned mobile radio communication device, it is possible to suppress noises caused by operation clocks transmitted to the controller, while the radio transmitting and receiving section is caused to cease its operation. However, since the controller operates in accordance with operation clocks while the radio transmitting and receiving section is operating, a problem remains unsolved that quality of a received signal is deteriorated due to noises caused by operation clocks transmitted to the controller, while the radio transmitting and receiving section is in operation.

SUMMARY OF THE INVENTION

In view of the above-mentioned problems of the prior art, it is an object of the present invention to provide a data processor which is less influenced by noises caused by operation clocks, and can operate at a high speed when quality of a received signal does not degrade.

It is also an object of the present invention to provide a method of controlling a frequency of, clock signals in accordance with which a data processor operates.

It is further an object of the present invention to provide a recording medium readable by a computer, storing a program therein for causing a computer to act as such a data processor as mentioned above or carry out such a method as mentioned above.

In one aspect of the present invention, there is provided a data processor having radio communication function, including (a) a clock generator for selectively generating clock signals having different frequencies, (b) a signal quality analyzer for analyzing quality of a received signal by comparing quality of a received signal to a predetermined threshold level, and (c) a frequency controller for causing the clock signals to have a first frequency when the quality of a received signal is judged not to degrade, and causing the clock signals to have a second frequency when the quality of a received signal is judged to degrade.

For instance, the first frequency may be set equal to an ordinary frequency, and the second frequency may be set equal to a frequency lower than the ordinary frequency.

In accordance with the above-mentioned data processor, when quality of a received signal degrades, a frequency of clock signals is set smaller, which enhances reliability in radio communication. On the other hand, when quality of a received signal does not degrade, a frequency of clock signals is set equal to an ordinary frequency, which ensures both reliability in radio communication and higher operation speed.

It is preferable the data processor having a microprocessor including both the signal quality analyzer and the frequency controller.

The signal quality analyzer may be designed to compare quality of a received signal to N predetermined threshold levels where N is a positive integer equal to two or greater, in which case, the frequency controller switches a frequency of the clock signals among (N+1) frequencies.

The predetermined threshold level may be designed to be variable. Thus, it would be possible to adjust a timing at which a frequency is to be switched, in accordance with a grade of a function of radio communication to be carried out by the data processor. Hence, a frequency of clock signals can be switched to an optimal frequency.

It is preferable that the data processor further includes an annunciator for annunciating that the clock signals are caused to have the second frequency.

The annunciator makes it possible for a user to readily become aware that the data processor is operating at a low speed.

The data processor may further include a prohibitor for prohibiting a frequency of the clock signals from being switched. A user can take precedence operation speed over quality of a received signal, even when quality of a received signal degrades.

The frequency controller may be designed to keep the clock signals to have the first frequency while the prohibitor prohibits a frequency of the clock signals from being switched.

It is preferable that the signal quality analyzer judges that quality of a received signal degrades when an electric field intensity of the received signal is lower than the threshold level successively M times where M is a predetermined positive integer, and judges that quality of a received signal does not degrade when an electric field intensity of the received signal is higher than the threshold level successively M times.

It is preferable that the frequency controller does not change a frequency of the clock signals when an electric field intensity of the received signal is not lower than the threshold level successively M times where M is a predetermined positive integer and further when an electric field intensity of the received signal is not higher than the threshold level successively M times.

It is preferable that the signal quality analyzer judges that quality of a received signal degrades when an average of successive M electric field intensities of the received signal is lower than the threshold level where M is a predetermined positive integer, and judges that quality of a received signal does not degrade when an average of successive M electric field intensities of the received signal is higher than the threshold level.

In another aspect of the present invention, there is provided a method of controlling a frequency of a clock signal employed in a data processor having radio communication function, including the steps of (a) comparing quality of a received signal to a predetermined threshold level, (b) causing the clock signal to have a first frequency when quality of a received signal is judged not to degrade, and (c) causing the clock signal to have a second frequency when quality of a received signal is judged to degrade.

For instance, the first frequency may be set equal to an ordinary frequency, and the second frequency may be set equal to a frequency lower than the ordinary frequency.

In the step (a), quality of a received signal may be compared to N predetermined threshold levels where N is a positive integer equal to two or greater, in which case, a frequency of the clock signal is switched among (N+1) frequencies.

The method may further include the step of changing the threshold level into another threshold level. The method may further include the step of annunciating that the clock signal is caused to have the second frequency. The method may further include the step of prohibiting a frequency of the clock signal from being switched.

It is preferable that the clock signal is kept to have the first frequency while a frequency of the clock signals is prohibited from being switched.

In the step (c), quality of a received signal is judged to degrade when an electric field intensity of the received signal is lower than the threshold level successively M times where M is a predetermined positive integer, and in the step (b) quality of a received signal is judged not to degrade when an electric field intensity of the received signal is higher than the threshold level successively M times. As an alternative, in the step (c), quality of a received signal is judged to degrade when an average of successive M electric field intensities of the received signal is lower than the threshold level where M is a predetermined positive integer, and in the step (b), quality of a received signal is judged not to degrade when an average of successive M electric field intensities of the received signal is higher than the threshold level.

It is preferable that a frequency of the clock signal is not changed when an electric field intensity of the received signal is not lower than the threshold level successively M times where M is a predetermined positive integer and further when an electric field intensity of the received signal is not higher than the threshold level successively M times.

In still another aspect of the invention, there is provided a recording medium readable by a computer, storing a program therein for causing a computer to act as the abovementioned data processor or carry out the abovementioned method.

In accordance with the present invention, when quality of a received signal is judged to degrade, based on an intensity of an electric field, a frequency of clock signals is caused to decrease. Hence, it is possible to reduce noises caused by clock signals, which enhances reliability in radio communication. When quality of a received signal is judged not to degrade, a clock signal is caused to have an ordinary frequency, and the data processor operates in accordance with clock signals having an ordinary frequency, which allows the data processor to operate at a high speed.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
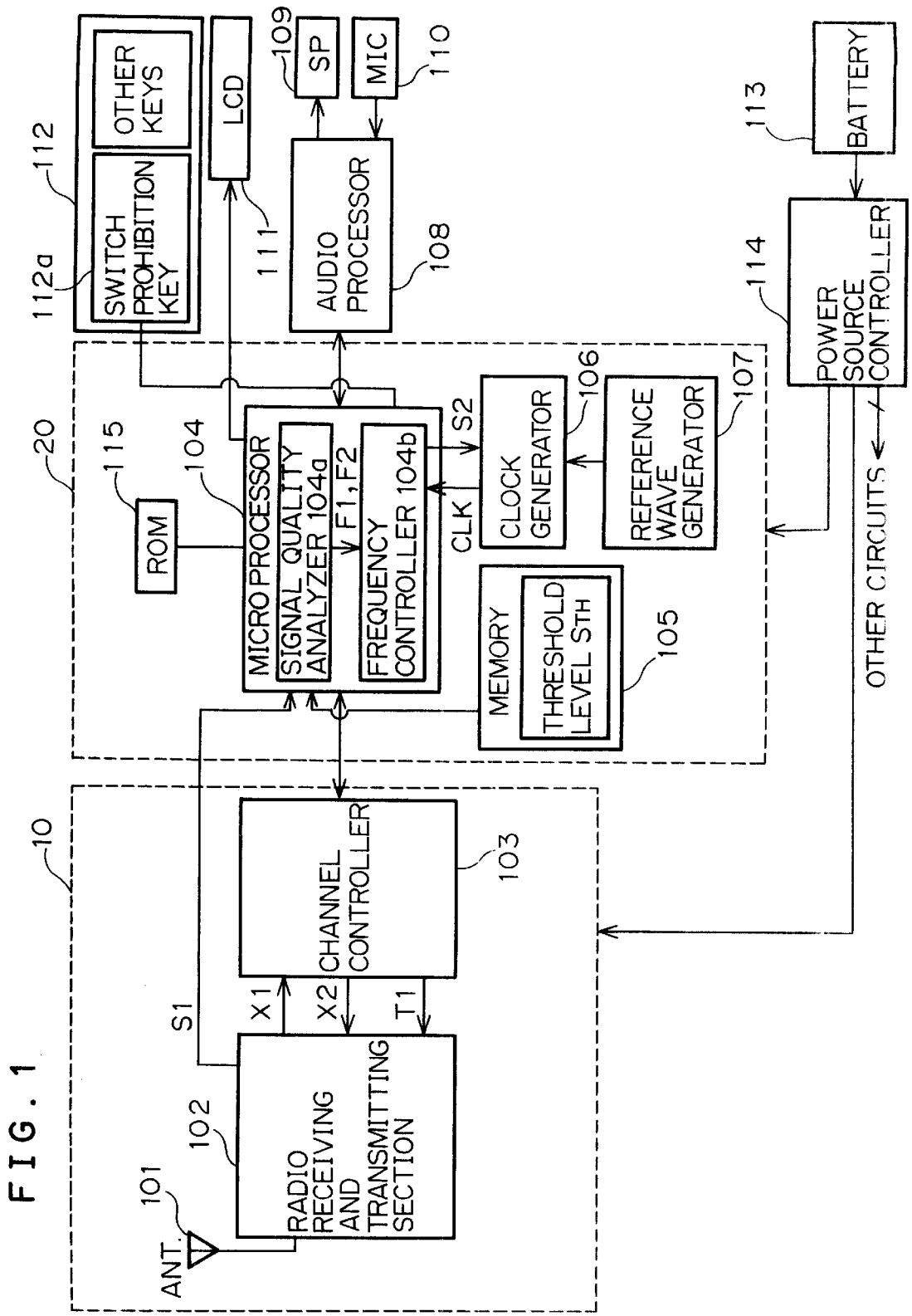
FIG. 1 is a block diagram of a handy radio communication terminal in accordance with an embodiment of the present invention.

FIG. 1 is a block diagram of a handy radio communication terminal as a data processor in accordance with the embodiment.

The illustrated handy radio communication terminal is comprised of a radio communication section 10, a data processing section 20, a key pad 112, a liquid crystal display 111, an audio processor 108, a speaker 109, a microphone 110, a power source controller 114, and a rechargeable battery 113.

The radio communication section 10 makes radio communication through public radio communication line or private radio communication line, and is comprised of an antenna 101, a radio receiving and transmitting section 102, and a channel controller 103.

The radio receiving and transmitting section 102 has a function of modulating and demodulating radio signals. That is, the radio receiving and transmitting section 102 demodulates a received signal, and transmits the thus demodulated signal X1 to the channel controller 103, and modulates a signal X2 transmitted from the channel controller 103, and transmits the thus modulated signal to the antenna 101. The radio receiving and transmitting section 102 further has a function of measuring an intensity of an electric field of a received radio signal. A signal S1 indicative of a measured intensity of an electric field is transmitted to a later mentioned signal quality analyzer 104a of a microprocessor 104 constituting the data processing section 20. The radio receiving and transmitting section 102 intermittently receives radio signals in accordance with a timing signal T1 transmitted from the channel controller 103.

The data processing section 20 is comprised of a microprocessor 104 which operates under a programmed control, a memory 105 storing a later mentioned threshold level $S_{TH}$ and other data therein, a clock generator 106 generating operation clock signals CLK, a reference wave generator 107, and a read only memory (ROM) 115 storing therein a program for controlling an operation of the microprocessor 104.

The microprocessor 104 includes a signal quality analyzer 104a and a frequency controller 104b.

The clock generator 106 generates operation clocks signals CLK, based on reference clock signals transmitted from the reference wave generator 107, and provides the thus generated operation clock signals CLK to the frequency controller 104b of the microprocessor 104.

The frequency controller 104b of the microprocessor. 104 operates in accordance with the operation clock signals CLK transmitted from the clock generator 106, and transmits a frequency switch signal S2 to the clock generator 106. The clock generator 106 switches a frequency of the operation clock signals CLK in accordance with the signal S2.

As later explained in detail, the signal quality analyzer 104a of the microprocessor 104 receives the signal S1, which is indicative of an intensity of an electric field of a received radio signal, from the radio receiving and transmitting section 102 at a constant interval. Each time the signal quality analyzer 104a receives the signal S1, the signal quality analyzer 104a compares an intensity of an electric field of a received signal, indicated by the signal S1, to the threshold level $S_{TH}$ stored in the memory 105, and transmits the signal S2 to the clock generator 106 to thereby switch a frequency of the operation clock signals CLK in accordance with the result of comparison.

The threshold level $S_{TH}$ stored in the memory 105 is rewritable, and hence, can be varied to a desired level in accordance with a characteristic of the radio communication section 10.

The audio processor 108 operates under a control by the microprocessor 104, and is connected to both the speaker 109 and the microphone 110.

The liquid crystal display 111 displays various informations.

A user can input various commands to the microprocessor 104 through the keypad 112. The keypad 112 includes a key 112a for inputting a command by which a frequency of the operation clock signals CLK is prohibited from being switched. It should be noted that a command for prohibiting switching a frequency of the operation clock signals CLK can be transmitted to the frequency controller 104b of the microprocessor 104 by tapping keys in a predetermined sequence, in which case, the key pad 112 does not need to have the key 112a.

The handy radio communication terminal in accordance with the embodiment is driven by the battery 113 as an electrical power source. The power source controller 114 provides electrical power to the radio communication section, the data processing section 20, and other circuits.

Figure 2:
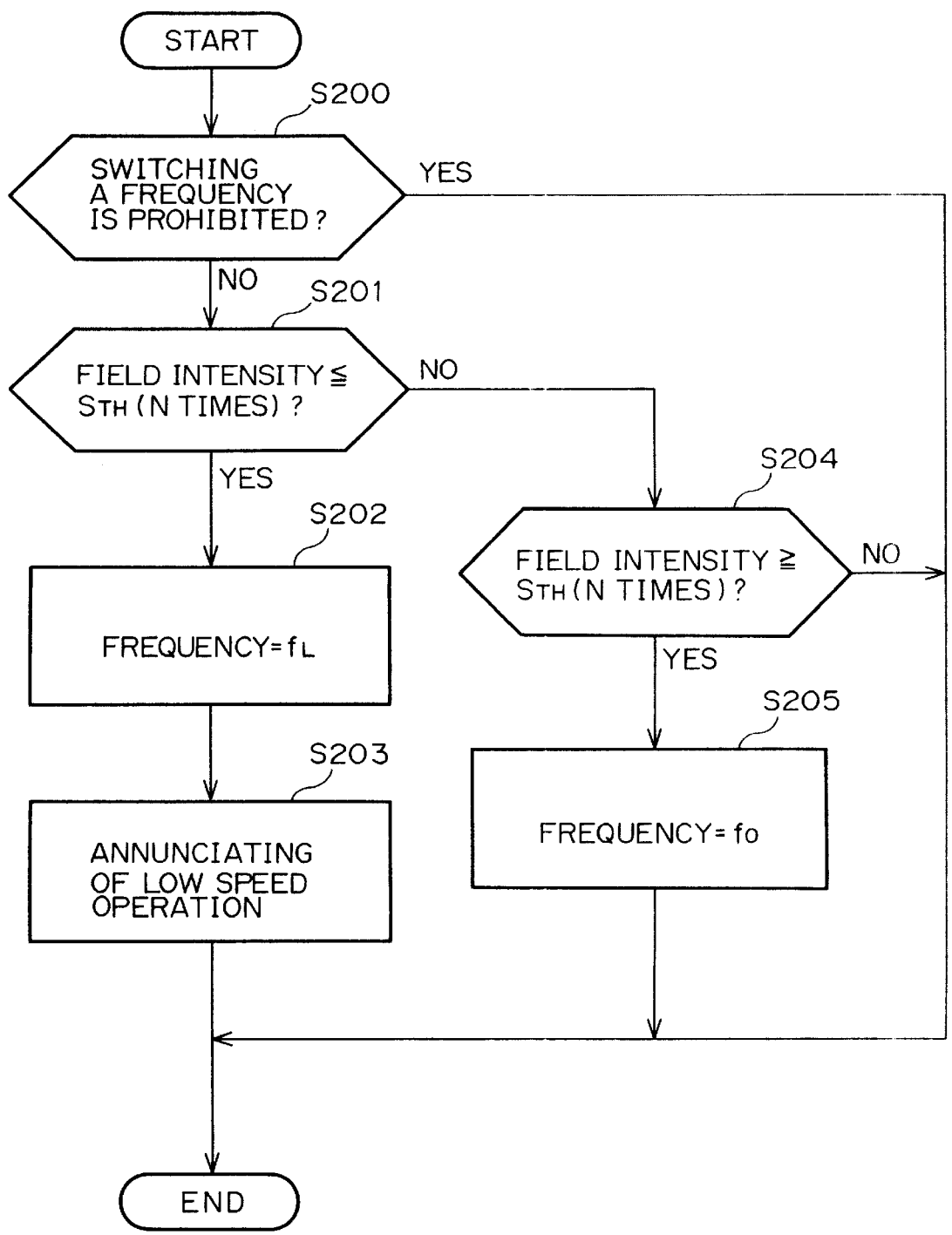
FIG. 2 is a flow chart of a method of controlling a frequency of clock signals, in accordance with the present invention.

FIG. 2 is a flow chart of a method of controlling a frequency of clock signals, in accordance with the present invention.

As mentioned earlier, the control for switching a frequency of the operation clock signals CLK is carried out by the microprocessor 104 including the signal quality analyzer 104a and the frequency controller 104b.

First, the signal quality analyzer 104a checks whether switching a frequency of the operation clock signals CLK is prohibited or not, in step 200.

If switching a frequency of the operation clock signals CLK is not prohibited (an answer is "NO" in step 200), the signal quality analyzer 104a judges whether quality of a received radio signal is acceptable, in step 201.

Specifically, if an intensity of an electric field of a received radio signal, indicated by the signal S1 transmitted to the signal quality analyzer 104a from radio receiving and transmitting section 102 at a predetermined interval, is judged to be lower than the threshold level $S_{TH}$ successively N (N is a positive integer) times (an answer is "YES" in step 201), the signal quality analyzer 104a transmits a signal F1 to the frequency controller 104b. On receipt of the signal F1, the frequency controller 104b transmits the signal S2 to the clock generator 106 to thereby cause the clock generator 106 to generate the operation clock signals CLK having a frequency $f_L$ which is smaller than an ordinary frequency $f_O$, in step 202.

In other words, when the signal quality analyzer 104a judges that an intensity of an electric field of a received radio signal is low, the microprocessor 104 is set to operate at a low speed. At the same time, the liquid crystal display 111 displays that the microprocessor 104 operates at a low speed, in step 203. Accordingly, a user readily knows that the microprocessor 104 is in low-speed operation at a look to the liquid crystal display 111.

As an alternative to displaying at the liquid crystal display 111, a user may be annunciated by means of the speaker 109 controlled by the audio processor 108, or by means of a light-emitting device (not illustrated) or an oscillator (not illustrated) for oscillating the handy radio communication terminal.

If an intensity of an electric field of a received radio signal is judged not to be lower than the threshold level $S_{TH}$ successively N times (an answer is "NO" in step 201), the signal quality analyzer 104a further judges whether an intensity of an electric field of a received radio signal is higher than the threshold level $S_{TH}$ successively N times, in step 204.

If an intensity of an electric field of a received radio signal is higher than the threshold level $S_{TH}$ successively N times (an answer is "NO" in step 204), the signal quality analyzer 104a transmits a signal F2 to the frequency controller 104b. On receipt of the signal F2, the frequency controller 104b transmits the signal S2 to the clock generator 106 to thereby cause the clock generator 106 to generate the operation clock signals CLK having an ordinary frequency $f_O$, in step 205.

That is, when the signal quality analyzer 104a judges that an intensity of an electric field of a received radio signal is not low, the microprocessor 104 is set to operate at an ordinary speed.

If an intensity of an electric field of a received radio signal is not lower than the threshold level $S_{TH}$ successively N times and not higher than the threshold level $S_{TH}$ successively N times (answers are "NO" in steps 201 and 204), the frequency controller 104b remains a frequency of the operation clock signals CLK unchanged. The reason is as follows. An electric field intensity of a received radio signal in a mobile terminal is instantaneously much varied due to fading and so on. Hence, if a frequency of the operation clock signals CLK were varied in accordance with the comparison result each time comparison is made between an intensity of an electric field of a received radio signal and the threshold level $S_{TH}$, it might exert a harmful influence on the performance of the data processing section 20.

While switching a frequency of the operation clock signals CLK is prohibited by a user (an answer is "YES" in step 200), the signal quality analyzer 104a transmits the signal F2 to the frequency controller 104b, which in turn transmits the signal S2 to the clock generator 106 to thereby cause the clock generator 106 to generate the operation clock signals CLK having an ordinary frequency.

Figure 3:
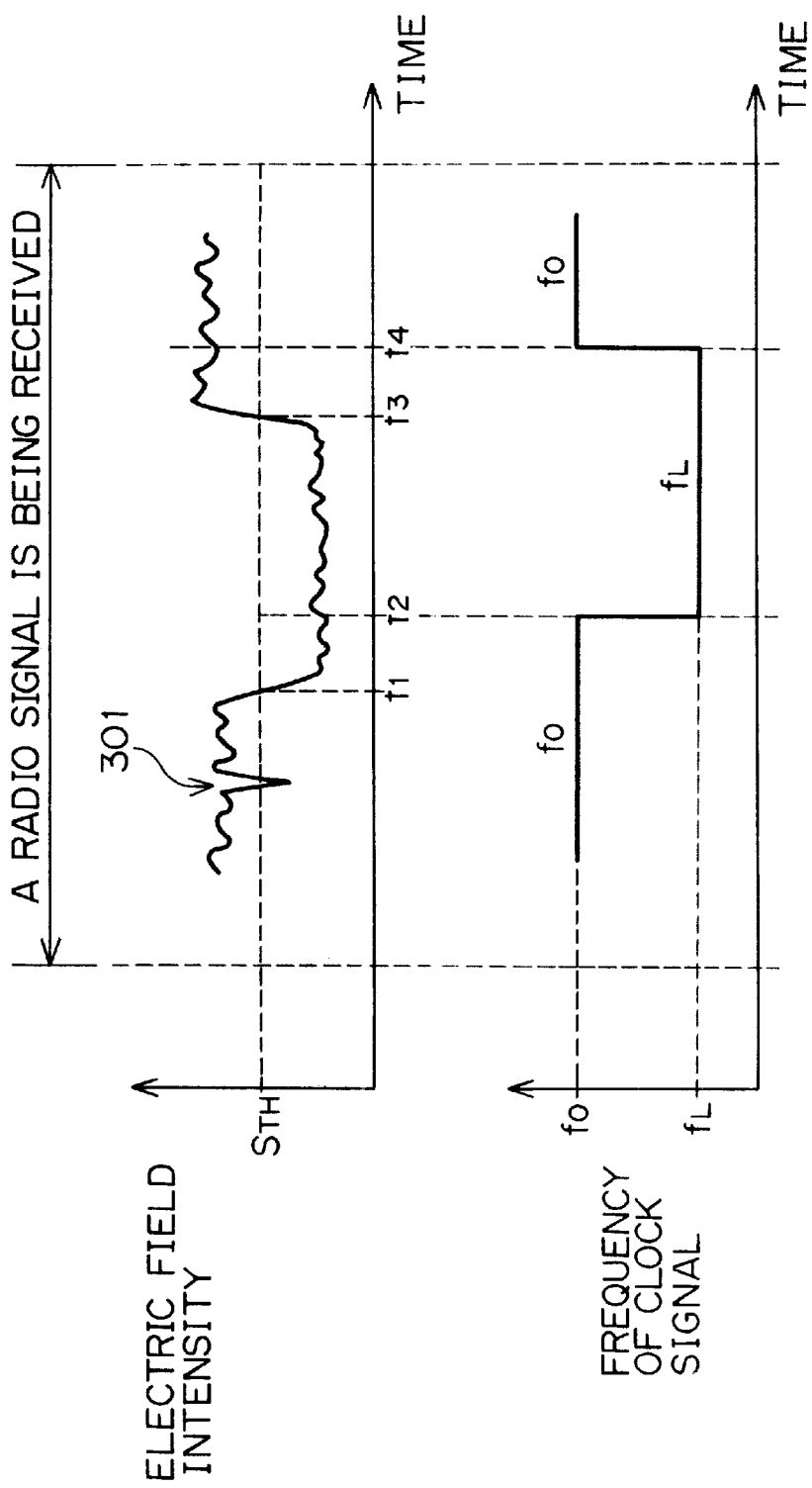
FIG. 3 illustrates a relationship between an intensity of an electric field of a received signal and a frequency of a clock signal.

Accordingly, a user can determine whether the microprocessor 104 is caused to operate at a restricted speed, when an intensity of an electric field of a received radio signal is low. In other words, a user can take precedence a high speed operation of the data processing section 20 over reliability in radio communication by selecting a mode where switching a frequency of the operation clock signals CLK is prohibited. It is also possible to set a mode where reliability in radio communication takes precedence on a high-speed operation of the data processing section 20, while switching a frequency of the operation clock signals CLK is prohibited FIG. 3 illustrates a relationship between an intensity of an electric field of a received signal and a frequency of the operation clock signal CLK.

The signal S1 indicative of an intensity of an electric field of a received radio signal is transmitted to the signal quality analyzer 104a of the microprocessor 104, and is compared to the threshold level $S_{TH}$. For instance, it is now presumed that an electric field intensity becomes lower than the threshold level $S_{TH}$ at a sampling time t1, and an electric field intensity remains lower than the threshold level $S_{TH}$ until a sampling time t2. The N number of samplings are carried out between the sampling times t1 and t2, wherein N is a positive integer.

In such a situation as mentioned above, a frequency of the operation clock signals CLK is switched at the sampling time t2 into the frequency $f_L$ smaller than the ordinary frequency $f_O$. Namely, the microprocessor 104 operates at a low speed after the sampling time t2. Since a frequency of the operation clock signals CLK is switched into the frequency $f_L$ only when an electric field intensity of a received radio signal is lower than the threshold level $S_{TH}$ successively N times, a frequency of the operation clock signals CLK remains unchanged, even if instantaneous reduction 301 in an electric field intensity occurs due to fading and so on.

Then, it is now presumed that an electric field intensity becomes higher than the threshold level $S_{TH}$ at a sampling time t3, and an electric field intensity remains higher than the threshold level $S_{TH}$ until a sampling time t4. The N number of samplings is carried out between the sampling times t3 and t4.

In such a situation, a frequency of the operation clock signals CLK is switched at the sampling time t4 into the ordinary frequency $f_O$.

In the above-mentioned embodiment, an electric field intensity is compared to the single threshold level $S_{TH}$. However, it should be noted that an electric field intensity may be compared to two or more threshold levels, in which case, a frequency of the operation clock signals CLK is switched into one of three or more frequencies, and the clock generator 106 has to have three or more different operation clock frequencies.

In the above-mentioned embodiment, a frequency of the operation clock signals CLK is switched into another frequency only when an electric field intensity of a received radio signal is lower than the threshold level $S_{TH}$ successively N times, or when an electric field intensity of a received radio signal is higher than the threshold level $S_{TH}$ successively N times. However, a critical point at which a frequency of the operation clock signals CLK is switched into another frequency is not to be limited to those. For instance, an average of successive M electric field intensities of a received radio signal may be selected as a critical point.

There may be selected any method of determining an electric field intensity, if the method can remove instantaneous fluctuation in an electric field intensity of a received radio signal.

In the above-mentioned embodiment, the radio receiving and transmitting section 102 measures an electric field intensity of a received radio signal. However, the handy radio communication terminal may include a device for measuring an electric field intensity of a received radio signal, separately from the radio receiving and transmitting section 102.

Hereinbelow is explained an embodiment of a recording medium storing a program therein for accomplishing the above-mentioned apparatus for.

A recording medium storing a program for accomplishing the above-mentioned data processor may be accomplished by programming functions of the above-mentioned data processor with a programming language readable by a computer, and recording the program in a recording medium such as CD-ROM, a floppy disc, a magnetic tape, and any other suitable means for storing a program therein.

As a recording medium may be employed a hard disc equipped in a server. It is also possible to accomplish the recording medium in accordance with the present invention by storing the above-mentioned computer program in such a recording medium as mentioned above, and reading the computer program by other computers through a network.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-13360 filed on Jan. 7, 1998 including specification, claims, drawings and summary is incorporated herein by reference in its entirety.

What is claimed is:

1. A data processor having radio communication function, comprising:
    (a) a clock generator for selectively generating clock signals having different frequencies;
    (b) a signal quality analyzer for analyzing quality of a received signal by comparing quality of a received signal to a predetermined threshold level, wherein said signal quality analyzer judges that quality of a received signal degrades when an electric field intensity of said received signal is lower than said threshold level successively M times where M is a predetermined positive integer, and judges that quality of a received signal does not degrade when an electric field intensity of said received signal is higher than said threshold level successively M times;
    (c) a frequency controller for causing said clock signals to have a first frequency when said quality of a received signal is judged not to degrade, and causing said clock signals to have a second frequency when said quality of a received signal is judged to degrade; and
    (d) a prohibitor for prohibiting a frequency of said clock signals from being switched.

2. The data processor as set forth in claim 1, wherein said first frequency is an ordinary frequency, and said second frequency is a frequency lower than said ordinary frequency.

3. The data processor as set forth in claim 1, further comprising a microprocessor including both said signal quality analyzer and said frequency controller.

4. The data processor as set forth in claim 1, wherein said signal quality analyzer compares quality of a received signal to N predetermined threshold levels where N is a positive integer equal to two or greater, and wherein said frequency controller switches a frequency of said clock signals among (N+1) frequencies.

5. The data processor as set forth in claim 1, wherein said predetermined threshold level is designed to be variable.

6. The data processor as set forth in claim 1, further comprising an annunciator for annunciating that said clock signals are caused to have said second frequency.

7. The data processor as set forth in claim 1, wherein said frequency controller keeps said clock signals to have said first frequency while said prohibitor prohibits a frequency of said clock signals from being switched.

8. The data processor as set forth in claim 1, wherein said frequency controller does not change a frequency of said clock signals when an electric field intensity of said received signal is not lower than said threshold level successively M times where M is a predetermined positive integer and further when an electric field intensity of said received signal is not higher than said threshold level successively M times.

9. The data processor as set forth in claim 1, wherein said signal quality analyzer judges that quality of a received signal degrades when an average of successive M electric field intensities of said received signal is lower than said threshold level where M is a predetermined positive integer, and judges that quality of a received signal does not degrade when an average of successive M electric field intensities of said received signal is higher than said threshold level.

10. A method of controlling a frequency of a clock signal employed in a data processor having radio communication function, comprising the steps of:
    (a) comparing quality of a received signal to a predetermined threshold level, wherein quality of said received signal is judged to degrade when an electric field intensity of said received signal is lower than said threshold level successively M times where M is a predetermined positive integer, and is judged not to degrade when an electric field intensity of said received signal is higher than said threshold level successively M times;
    (b) causing said clock signal to have a first frequency when quality of a received signal is judged not to degrade;
    (c) causing said clock signal to have a second frequency when quality of a received signal is judged to degrade; and
    (d) prohibiting a frequency of said clock signal from being switched.

11. The method as set forth in claim 10, wherein said first frequency is an ordinary frequency, and said second frequency is a frequency lower than said ordinary frequency.

12. The method as set forth in claim 10, wherein quality of a received signal is compared to N predetermined threshold levels where N is a positive integer equal to two or greater, in said step (a), and wherein a frequency of said clock signal is switched among (N+1) frequencies.

13. The method as set forth in claim 10, further comprising the step of changing said threshold level into another threshold level.

14. The method as set forth in claim 10, further comprising the step of annunciating that said clock signal is caused to have said second frequency.

15. The method as set forth in claim 10, wherein said clock signal is kept to have said first frequency while a frequency of said clock signals is prohibited from being switched.

16. The method as set forth in claim 10, wherein a frequency of said clock signal is not changed when an electric field intensity of said received signal is not lower than said threshold level successively M times where M is a predetermined positive integer and further when an electric field intensity of said received signal is not higher than said threshold level successively M times.

17. The method as set forth in claim 10, wherein quality of a received signal is judged to degrade when an average of successive M electric field intensities of said received signal is lower than said threshold level where M is a predetermined positive integer, and is judged not to degrade when an average of successive M electric field intensities of said received signal is higher than said threshold level.

18. A recording medium readable by a computer, storing a program therein for causing a computer to act as a data processor, said data processor comprising:
    (a) a clock generator for selectively generating clock signals having different frequencies;
    (b) a signal quality analyzer for analyzing quality of a received signal by comparing quality of a received signal to a predetermined threshold level, wherein said signal quality analyzer judges that quality of a received signal degrades when an electric field intensity of said received signal is lower than said threshold level successively M times where M is a predetermined positive integer, and judges that quality of a received signal does not degrade when an electric field intensity of said received signal is higher than said threshold level successively M times;
    (c) a frequency controller for causing said clock signals to have a first frequency when said quality of a received signal is judged not to degrade, and causing said clock signals to have a second frequency when said quality of a received signal is judged to degrade; and (d) a prohibitor for prohibiting a frequency of said clock signals from being switched.

19. The recording medium as set forth in claim 18, wherein said first frequency is an ordinary frequency, and said second frequency is a frequency lower than said ordinary frequency.

20. The recording medium as set forth in claim 18, wherein said signal quality analyzer compares quality of a received signal to N predetermined threshold levels where N is a positive integer equal to two or greater, and wherein said frequency controller switches a frequency of said clock signals among (N+1) frequencies.

21. The recording medium as set forth in claim 18, wherein said predetermined threshold level is designed to be variable.

22. The recording medium as set forth in claim 18, wherein said data processor further comprises an annunciator for annunciating that said clock signals are caused to have said second frequency.

23. The recording medium as set forth in claim 18, wherein said frequency controller keeps said clock signals to have said first frequency while said prohibitor prohibits a frequency of said clock signals from being switched.

24. The recording medium as set forth in claim 18, wherein said frequency controller does not change a frequency of said clock signals when an electric field intensity of said received signal is not lower than said threshold level successively M times where M is a predetermined positive integer and further when an electric field intensity of said received signal is not higher than said threshold level successively M times.

25. The recording medium as set forth in claim 18, wherein said signal quality analyzer judges that quality of a received signal degrades when an average of successive M electric field intensities of said received signal is lower than said threshold level where M is a predetermined positive integer, and judges that quality of a received signal does not degrade when an average of successive M electric field intensities of said received signal is higher than said threshold level.

26. A recording medium readable by a computer, storing a program therein for causing a computer to carry out a method of controlling a frequency of a clock signal employed in a data processor having radio communication function, said method comprising the steps of:

(a) comparing quality of a received signal to a predetermined threshold level, wherein quality of said received signal is judged to degrade when an electric field intensity of said received signal is lower than said threshold level successively M times where M is a predetermined positive integer, and is judged not to degrade when an electric field intensity of said received signal is higher than said threshold level successively M times;

(b) causing said clock signal to have a first frequency when quality of a received signal is judged not to degrade;

(c) causing said clock signal to have a second frequency when quality of a received signal is judged to degrade; and (d) prohibiting a frequency of said clock signal from being switched.

27. The recording medium as set forth in claim 26, wherein said first frequency is an ordinary frequency, and said second frequency is a frequency lower than said ordinary frequency.

28. The recording medium as set forth in claim 26, wherein quality of a received signal is compared to N predetermined threshold levels where N is a positive integer equal to two or greater, in said step (a), and wherein a frequency of said clock signal is switched among (N+1) frequencies.

29. The recording medium as set forth in claim 26, wherein said method further comprises the step of changing said threshold level into another threshold level.

30. The recording medium as set forth in claim 26, wherein said method further comprises the step of annunciating that said clock signal is caused to have said second frequency.

31. The recording medium as set forth in claim 26, wherein said clock signal is kept to have said first frequency while a frequency of said clock signals is prohibited from being switched.

32. The recording medium as set forth in claim 26, wherein a frequency of said clock signal is not changed when an electric field intensity of said received signal is not lower than said threshold level successively M times where M is a predetermined positive integer and further when an electric field intensity of said received signal is not higher than said threshold level successively M times.

33. The recording medium as set forth in claim 26, wherein quality of a received signal is judged to degrade when an average of successive M electric field intensities of said received signal is lower than said threshold level where M is a predetermined positive integer, and is judged not to degrade when an average of successive M electric field intensities of said received signal is higher than said threshold level.

* * * * *